(12) United States Patent
Pawlowski et al.

(10) Patent No.: US 7,873,700 B2
(45) Date of Patent: Jan. 18, 2011

(54) MULTI-PROTOCOL STORAGE APPLIANCE THAT PROVIDES INTEGRATED SUPPORT FOR FILE AND BLOCK ACCESS PROTOCOLS

(75) Inventors: Brian Pawlowski, Palo Alto, CA (US); Mohan Srinivasan, Cupertino, CA (US); Herman Lee, Mountain View, CA (US); Vijayan Rajan, Sunnyvale, CA (US); Joseph C. Pittman, Apex, NC (US)

(73) Assignee: NetApp, Inc., Sunnyvale, CA (US)

( * ) Notice: Subject to any disclaimer, the term of this patent is extended or adjusted under 35 U.S.C. 154(b) by 1084 days.

(21) Appl. No.: 10/215,917

(22) Filed: Aug. 9, 2002

(65) Prior Publication Data
US 2004/0030668 A1    Feb. 12, 2004

(51) Int. Cl.
G06F 15/167 (2006.01)
G06F 15/16 (2006.01)
G06F 7/00 (2006.01)
G06F 13/00 (2006.01)

(52) U.S. Cl. .................. 709/213; 709/217; 709/230; 707/781; 711/100

(58) Field of Classification Search .................. 709/202, 709/213, 225, 23, 217; 711/100; 707/781
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |

(Continued)

FOREIGN PATENT DOCUMENTS

WO    WO 89/10594    11/1989

(Continued)

OTHER PUBLICATIONS

Gibson et al., "Network Attached Storage Architecture", Communications of the ACM, vol. 43, No. 11, Nov. 2000.*

(Continued)

*Primary Examiner*—Kristie D Shingles
(74) *Attorney, Agent, or Firm*—Cesari and McKenna, LLP (57) ABSTRACT

A multi-protocol storage appliance serves file and block protocol access to information stored on storage devices in an integrated manner for both network attached storage (NAS) and storage area network (SAN) deployments. A storage operating system of the appliance implements a file system that cooperates with novel virtualization modules to provide a virtualization system that "virtualizes" the storage space provided by the devices. Notably, the file system provides volume management capabilities for use in block-based access to the information stored on the devices. The virtualization system allows the file system to logically organize the information as named file, directory and virtual disk (vdisk) storage objects to thereby provide an integrated NAS and SAN appliance approach to storage by enabling file-based access to the files and directories, while further enabling block-based access to the vdisks.

37 Claims, 4 Drawing Sheets

U.S. PATENT DOCUMENTS

| | | | |
|---|---|---|---|
| 4,843,541 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,916,608 A | 4/1990 | Shultz | |
| 4,989,206 A | 1/1991 | Dunphy, Jr. et al. | |
| 5,124,987 A | 6/1992 | Milligan et al. | |
| 5,129,088 A | 7/1992 | Auslander et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,426,747 A | 6/1995 | Weinreb et al. | |
| 5,485,579 A | 1/1996 | Hitz et al. | |
| 5,511,177 A | 4/1996 | Kagimasa et al. | |
| 5,581,724 A | 12/1996 | Belsan et al. | |
| 5,764,972 A | 6/1998 | Crouse et al. | |
| 5,802,366 A | 9/1998 | Row et al. | |
| 5,819,292 A | 10/1998 | Hitz et al. | |
| 5,828,876 A | 10/1998 | Fish et al. | |
| 5,870,734 A | 2/1999 | Kao | |
| 5,897,661 A | 4/1999 | Baranovsky et al. | |
| 5,907,672 A | 5/1999 | Matze et al. | |
| 5,918,229 A | 6/1999 | Davis et al. | |
| 5,931,918 A | 8/1999 | Row et al. | |
| 5,941,972 A | 8/1999 | Hoese et al. | |
| 5,944,789 A * | 8/1999 | Tzelnic et al. | 709/214 |
| 5,946,685 A | 8/1999 | Cramer et al. | |
| 5,963,962 A | 10/1999 | Hitz et al. | |
| 5,987,477 A | 11/1999 | Schmuck et al. | |
| 5,996,024 A | 11/1999 | Blumenau | |
| 5,996,047 A | 11/1999 | Peacock | |
| 6,038,570 A | 3/2000 | Hitz et al. | |
| 6,065,037 A | 5/2000 | Hitz et al. | |
| 6,173,293 B1 | 1/2001 | Thekkath et al. | |
| 6,173,374 B1 | 1/2001 | Heil et al. | |
| 6,185,655 B1 | 2/2001 | Peping | |
| 6,275,898 B1 | 8/2001 | DeKoning | |
| 6,324,581 B1 | 11/2001 | Xu et al. | |
| 6,397,242 B1 * | 5/2002 | Devine et al. | 718/1 |
| 6,425,035 B2 | 7/2002 | Hoese et al. | |
| 6,438,642 B1 * | 8/2002 | Shaath | 711/100 |
| 6,457,021 B1 | 9/2002 | Berkowitz et al. | |
| 6,493,811 B1 * | 12/2002 | Blades et al. | 711/203 |
| 6,496,847 B1 * | 12/2002 | Bugnion et al. | 718/1 |
| 6,526,478 B1 | 2/2003 | Kirby | |
| 6,606,690 B2 * | 8/2003 | Padovano | 711/148 |
| 6,618,798 B1 | 9/2003 | Burton et al. | |
| 6,636,879 B1 | 10/2003 | Doucette et al. | |
| 6,697,846 B1 | 2/2004 | Soltis | |
| 6,701,449 B1 | 3/2004 | Davis et al. | |
| 6,721,764 B2 | 4/2004 | Hitz et al. | |
| 6,745,207 B2 * | 6/2004 | Reuter et al. | 707/200 |
| 6,757,778 B1 * | 6/2004 | van Rietschote | 711/6 |
| 6,779,063 B2 * | 8/2004 | Yamamoto | 710/74 |
| 6,807,581 B1 | 10/2004 | Starr et al. | |
| 6,834,326 B1 | 12/2004 | Wang et al. | |
| 6,868,417 B2 * | 3/2005 | Kazar et al. | 1/1 |
| 6,977,927 B1 | 12/2005 | Bates et al. | |
| 6,978,283 B1 | 12/2005 | Edwards et al. | |
| 7,089,293 B2 * | 8/2006 | Grosner et al. | 709/217 |
| 7,107,385 B2 * | 9/2006 | Rajan et al. | 711/4 |
| 7,127,633 B1 * | 10/2006 | Olson et al. | 714/4 |
| 7,165,096 B2 * | 1/2007 | Soltis | 709/217 |
| 7,194,538 B1 * | 3/2007 | Rabe et al. | 709/224 |
| 7,216,148 B2 * | 5/2007 | Matsunami et al. | 709/216 |
| 7,231,412 B2 | 6/2007 | Hitz et al. | |
| 7,275,050 B2 * | 9/2007 | Fujimoto | 1/1 |
| 7,328,260 B1 * | 2/2008 | Muthiyan et al. | 709/224 |
| 7,403,987 B1 * | 7/2008 | Marinelli et al. | 709/223 |
| 7,409,494 B2 | 8/2008 | Edwards et al. | |
| 7,441,029 B2 * | 10/2008 | Kano et al. | 709/225 |
| 7,590,807 B2 | 9/2009 | McGovern et al. | |
| 2001/0044879 A1 * | 11/2001 | Moulton et al. | 711/114 |
| 2002/0049883 A1 | 4/2002 | Schneider et al. | |
| 2002/0112022 A1 | 8/2002 | Kazar et al. | |
| 2002/0116593 A1 | 8/2002 | Kazar et al. | |
| 2002/0120763 A1 * | 8/2002 | Miloushev et al. | 709/230 |
| 2002/0161982 A1 * | 10/2002 | Riedel | 711/170 |
| 2003/0236988 A1 * | 12/2003 | Snead | 713/193 |
| 2004/0030668 A1 | 2/2004 | Pawlowski et al. | |
| 2004/0139167 A1 | 7/2004 | Edsall et al. | |
| 2004/0233910 A1 * | 11/2004 | Chen et al. | 370/395.5 |
| 2006/0184587 A1 | 8/2006 | Federwisch et al. | |
| 2007/0088702 A1 | 4/2007 | Fridella et al. | |

FOREIGN PATENT DOCUMENTS

| | | |
|---|---|---|
| WO | WO 02/50433 A1 | 6/2002 |

OTHER PUBLICATIONS

"Network Appliance Ends NAS/SAN War" by Computerwire, http://www.theregister.co.uk/content/63/27368.html; posted on Feb. 10, 2002.

EMC Symmetrix DMS Series, EMC2 where information lives, (c) 2003.

EMC Celerra HighRoad, EMC2 where information lives, Dec. 2001, pp. 1-10.

Celerra File Server Architecture for High Availability, EMC2 where information lives, Aug. 1999, pp. 1-7.

Rowell Hernandez, Keith Carmichael, Cher Kion Chai and Geoff Cole, IP Storage Networking: IBM NAS and iSCSI Solutions, IBM Corp., Second Edition (Feb. 2002), pp. i-xvi and 1-298.

Maintenance Procedures ND (8C) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

Anthony J. McGregor Department of Computer Science, University of Waikato Dissertation: Block-Based Distributed File Systems Jul. 1997.

Callaghan B. "NFS Version 3 Protocol Specification", Request for Comments (RFC) 1813 Jun. 1995.

International Search Report PCT/US03/23597, Mar. 9, 2004, 7 pages, International Searching Authority, Alexandria, Virginia, USA.

International Search Report PCT/US03/23597, Apr. 14, 2004, 8 pages, International Searching Authority, Alexandria, Virginia, USA.

Lu, Y. "Performance Study of iSCSI-Based Storage Subsystems", IEEE Communications Magazine, pp. 76-82, Aug. 2003.

European Patent Office Communication of European Search Report, European Application No. 03784832.2, based on PCT/US03/23597, Mailed Jul. 20, 2007, 4 pages.

Schulz, Greg, "SAN and NAS; Complementary Technologies: SAN and NAS Provide Storage and Data Sharing, Version 1.0", (http://www.mti.com/white_papers/WP20002.pdf), MTI Technology, Anaheim, California, May 1, 2000, 11 pages.

Alvarado, Michael and Pandit, Puneet, "How Convergence Will End the SAN/NAS Debate", DM Review, Powell Publications, West Allis, Wisconsin, vol. 1, No. 2, Feb. 2001, 3 pages.

Administration Guide found at http://www.openafs.org/pages/doc/AdminGuide/auagd010.htm, visited on Mar. 2, 2005, 34 pages.

Akyurek, Sedat, Placing Replicated Data to Reduce Seek Delays, Department of Computer Science, University of Maryland, UMIACS-TR-91-121, CS-TR-2746, Aug. 1991.

Basilico, et al., Error Correction System Using "Shadow Memory," IBM Technical Disclosure Bulletin, May 1984, pp. 5792-5793.

Bhattacharya, Supama et al., "Coordinating Backup/Recovery and Data Consistency between Database and File Systems", ACM, Jun. 2002, pp. 500-511.

Bitton, Dina, Disk Shadowing, Proceedings of the 14.sup.th VLDB Conference, LA, CA (1988), 8 pages.

Blasgen, M.W. et al., System R: An architectural Overview, Reprinted from IBM Systems Journal vol. 20, No. 1, 1981, Copyright 1981, 1999, 22 pages.

Borenstein, Nathaniel S., CMU's Andrew project a retrospective, Communications of ACM, 39(12), Dec. 1996, 33 pages.

Brown, Mark R. et al., The Alpine file system, ACM Transactions on Computing Systems, 3(4):261-293, Nov. 1985.

Chaudhuri, Surajit, et al., Self-Tuning Technology in Microsoft SQL Server, Data Engineering Journal 22, Feb. 1999 pp. 20-27.

Chen, Peter M., et al., An Evaluation of Redundant Arrays of Disks Using an Amdahl 5890 Peformance Evaluation, pp. 74-85, 1990.

Chutani, Sailesh, et al., The Episode File System, in Proceedings of the USENIX Winter 1992, 18 pages.

Clark, B.E., et al., Application System /400 Performance Characteristics, IBM Systems Journal, 28(3):407-423, 1989.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Coyne, Robert A., et al., Storage Systems for National Information Assets, Proc. Supercomputing 92, Minneapolis, Nov. 1992, pp. 626-633.

Data Sheet for the Check Point Software Technologies product Flood-Gate-1 (1997), 8 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4), Fall 1991, pp. 353-385.

Fielding et al., (1999) Request for Comments (RFC) 2616, HTTP/1.1, 144 pages.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Gray, Jim, et al., The Recovery Manager of the System R Database Manager, ACM Computing Surveys, (13)2:223-242 1981, 20 pages.

Hartman, John H. et al., Performance Measurements of a Multiprocessor Sprite Kernel, Proceedings of the USENIX Conference, 1990, 13 pages.

Hecht, Matthew S., et al. Shadowed Management of Free Disk Pages with a Linked List, ACM Transactions on Database Systems, 8/4, Dec. 1983, pp. 503-514.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

The IBM System/38, Chapter 8, pp. 137-15.

Isomaki, Markus, Differentiated Service for the Internet, Department of Technical Physics and Mathematics, May 9, 1998, 17 pages.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Lomet, David., et al., The performance of a multiversion access method, ACM SIGMOD International Conference on Management of Data, 19:353-363.

Lorie, Raymond, A, Physical Integrity in a large segmented database, ACM Trans. Database Systems, 2(1): 91-104, Mar. 1977.

Lorie, Ra, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Miller, Ethan L., et al., RAMA: A File System for Massively Parallel Computers, 12.sup.th IEEE Symposium on Mass Storage Systems, Monterey CA, Apr. 1993, pp. 163-168.

Moons, Herman et al., Location-Independent Object Invocation in Open Distributed Systems, Autumn 1991 EurOpen Technical Conference and Exhibition, pp. 287-300 (Sep. 16-20, 1991).

Morris, James H., et al., Andrew: A Distributed Personal Computing Environment, Comm. of the ACM, vol. 29, Mar. 1986, pp. 184-201.

Mullender, Sape J., et al., A distributed file service based on optimistic concurrency control, ACM Symposium on Operating System Principles (Orcas Island, Washington). Published as Operating Systems Review, 19(5):51-62, Dec. 1985.

Muller, Keith, et al., A High Performance Multi-Structured File System Design, In Proceedings of the 13th ACM Symposium on Operating Systems Principles, Oct. 1991, pp. 56-67.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective on the Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached Worm File System, Software-Practice and Experience, 21(12):1289-1299 (1991).

Rosenberg, J., et al., Stability in a Persistant Store Based on a Large Virtual Memory, in Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, in Proceedings of ACM Transactions on Computer Systems, (10)1:26-52, Feb. 1992.

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, in Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment Carnegie Mellon University, CMU-ITC.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Hamilton et al. "System and Method for Managing File Metadata During Consistency Points", U.S. Appl. No. 705-025, filed Nov. 10, 2003, 37 pages.

Hitz et al. "System and Method for Enabling a Storage System to Support Multiple Formats Simultaneously", U.S. Appl. No. 60/652,626, filed Feb. 14, 2005, 39 pages.

User Guide found at http://www.openafs.org/pages/doc/UserGuide/auusg004.htm, visited on Mar. 2, 2005, 8 pages.

Weikum, Gerhard, et al., Towards Self-Tuning Memory Management for Data Servers, Data Engineering Journal 22, Feb. 1999 pp. 3-11.

Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.

Welch, Brent B., et al., Pseudo-File-Systems, Computer Science Division, Department of Electrical Engineering and Computer Sciences. Univ. of CA, Berkley, Oct. 1989, 22 pages.

West, Michael, et al. The ITC Distributed File System: Prototype and Experience, Carnegie-Mellon University, Technical Report CMU-ITC-040, Mar. 1985, 17 pages.

Wikipedia, The Free Encyclopedia, Redundant Arrays of Independent Disks, at http:/en.wikipedia.org/wiki/RAID, visited on Mar. 9, 2005, 9 pages.

Wittle, Mark, et al., LADDIS: The next generation in NFS file server benchmarking, USENIX Association Conference Proceedings, Apr. 1993, 29 pages.

Zayas, Edward R., AFS-3 Programmer's Reference: Architectural Overview, Transarc Corporation, Pittsburgh, PA, 1.0 edition 1991, 37 pages.

"Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Oct. 29, 2007 in United States District Court for the Northern District of California, San Jose Division, Civil Action No. 5:07-cv-05448-JW, 15 pages.

"First Amended Complaint for (1) Patent Infringement (2) Unfair Competition Under the Lanham Act (3) Unfair Competition Under Cal. Bus. & Prof. Code § 17200, Demand for Jury Trial and Certification of Interested Entities or Parties", filed Nov. 2, 2007 in United States District Court for the Northern District of California, San Jose Division, Civil Action No. 5:07-cv-05448-JW, 15 pages.

"Answer and Counterclaims to First Amended Complaint for: (1) Patent Infringement, (2) Unfair Competition Under the Lanham Act, (3) Unfair Competition Under Cal. Bus. & Prof. Code § 17200", filed Dec. 21, 2007 in United States District Court for the Northern District of California, San Francisco Division. Case No. 5:07-cv-05448-JW, 29 pages.

Sun Microsystems Inc.'s Reply to Network Appliance, Inc.'s Answer and Counterclaims to First Amended Complaint, filed Jan. 14, 2008 in United States District Court for the Northern District of California, San Francisco Division. Case No. 5:07-cv-05448-JW, 14 pages.

"Supplemental Answer and Counterclaims to First Amended Complaint for: (1) Patent Infringement, (2) Unfair Competition Under the Lanham Act, (3) Unfair Competition Under Cal. Bus. & Prof. Code § 17200", filed Feb. 19, 2008 in United States District Court for the Northern District of California, San Francisco Division. Case No. 5:07-cv-05448-JW, 28 pages.

"Sun Microsystems Inc.'s Reply to Network Appliance, Inc.'s Supplemental Answer and Counterclaims to First Amended Complaint and Counterclaims for Declaratory Relief", filed Mar. 7, 2008 in United States District Court for the Northern District of California, San Francisco Division. Case No. 5:07-cv-05448-JW, 19 pages.

"Plaintiff-Counterdefendant Sun Microsystems, Inc.'s Preliminary Invalidity Contentions and Accompanying Document Production for U.S. Patent No. 6,868,417", filed May 30, 2008 in United States District Court for the Northern District of California, San Jose Division, Civil Action No. 5:07-cv-05448-JW, 79 pages.

"Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 34 pages.

"Declaration of Dr. Scott Brandt in Support of Sun Microsystems, Inc.'s Opening Claim Construction Brief Concerning the NetApp Patent Claim Terms", filed Sep. 15, 2008 in United States District Court for the Northern District of California, San Jose Division, Civil Action No. 5:07-cv-05448-JW, 7 pages.

"Declaration of Dr. John Hartman in Support of Sun Microsystems, Inc.'s Opening Claim Construction Brief (with Exhibits 1-4)", filed Sep. 15, 2008 in United States District Court for the Northern District of California, San Jose Division, Civil Action No. 5:07-cv-05448-JW, 34 pages.

"Sun Microsystems, Inc.'s Responsive Claim Construction Brief Concerning the Sun Patent Claim Terms", filed Sep. 29, 2008 in United States District Court for the Northern District of California, San Francisco Division, Case No. 3:07-cv-05488-EDL, 35 pages.

"Declaration of Dr. Martin E. Kaliski in Support of Sun Microsystems, Inc.'s Responsive Claim Construction Brief" (with Exhibits A-D), filed Sep. 29, 2008 in United States District Court for the Northern District of California, San Francisco Division, Case No. 3:07-cv-05488-EDL, 34 pages.

"Declaration of Dr. A.L. Narashima Reddy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv- 05488-EDL, 18 pages.

"Declaration of Dr. John Levy in Support of Sun Microsystems, Inc.'s Responsive Claim Construction Brief Concerning the Sun Patent Claim Terms" (with Exhibit A), filed Sep. 29, 2008 in United States District Court for the Northern District of California, San Francisco Division, Case No. 3:07-cv-05488-EDL, 20 pages.

"NetApp Inc.'s Reply to Sun Microsystems, Inc.'s Responsive Claim Construction Brief", filed Oct. 10, 2008 in United States District Court for the Northern District of California, San Francisco Division, Case No. 3:07-cv-05488-EDL, 19 pages.

"Sun Microsystems, Inc.'s Reply Claim Construction Brief Concerning the NetApp Patent Claim Terms", filed Oct. 10, 2008 in United States District Court for the Northern District of California, San Francisco Division, Case No. 3:07-cv-05488-EDL, 24 pages.

"Declaration of Dr. John H. Hartman in Support of Sun Microsystems, Inc.'s Reply Claim Construction Brief", filed Oct. 10, 2008 in United States District Court for the Northern District of California, San Francisco Division, Case No. 3:07-cv-05488-EDL, 3 pages.

"Declaration of Dr. Scott Brandt in Support of Sun Microsystems, Inc.'s Reply Claim Construction Brief Concerning the NetApp Patent Claim Terms (with Exhibit 1)", filed Oct. 10, 2008 in United States District Court for the Northern District of California, San Francisco Division, Case No. 3:07-cv-05488-EDL, 34 pages.

"Order Construing Claim Terms of the '720 and '417 Patents", filed Dec. 23, 2008 in United States District Court for the Northern District of California, San Francisco Division, Case No. 3:07-cv-05488-EDL, 38 pages.

"Order Regarding Tentative Claim Construction", filed Jan. 14, 2009 in United States District Court for the Northern District of California, San Francisco Division, Case No. 3:07-cv-05488-EDL, 2 pages.

"Expert Report of Mark E. Nusbaum", dated Oct. 12, 2009 in United States District Court for the Northern District of California, San Francisco Division, Case No. 3:07-cv-05488-EDL, 97 pages.

"Opening Expert Report of Scott Brandt, Ph.D., Regarding the Invalidity and Unenforceability of U.S. Patent Nos. 6,868,417 and 7,107,385", dated Oct. 12, 2009 in United States District Court for the Northern District of California, San Francisco Division, Case No. 3:07-cv-05488-EDL, 180 pages.

"Rebuttal Expert Report of Gregory R. Ganger Regarding Validity of U.S. Patent Nos. 6,868,417 and 7,107,385", dated Nov. 4, 2009 in United States District Court for the Northern District of California, San Francisco Division, Case No. 3:07-cv-05488-EDL, 253 pages.

"Rebuttal Expert Report of Cameron K. Weiffenbach", dated Nov. 4, 2009 in United States District Court for the Northern District of California, San Francisco Division, Case No. 3:07-cv-05488-EDL, 21 pages.

"Sun Microsystems, Inc.'s Notice of Motion and Motion for Summary Judgment of Non-Infringement of NetApp's U.S. Patent No. 6,868,417", dated Dec. 2, 2009, United States District Court for the Northern District of California, San Francisco Division, Case No. 3:07-cv-05488-EDL, 28 pages.

"Order Denying Sun's Motion for Summary Judgment of Non-Infringement of U.S. Patent No. 6,868,417; Granting in Part and Denying in Part Sun's Motion to Strike Supplemental Expert Report of Dr. Ganger; Sustaining NetApp's Objection to Declaration of Jeff Bonwick; and Overruling Sun's Objection to Robert Gittens' Deposition Testimony", dated Mar. 22, 2010, filed in United States District Court for the Northern District of California, San Francisco Division, Case No. 3:07-cv-05488-EDL, 35 pages.

Auspex Systems, LFS—A Local File System for Multiprocessor NFS Network Servers, 1994, 6 pages.

Levine, Ron and Michelle Gervais, Building a SAN, SunExpert Magazine, Mar. 1999, pp. 50-64.

McGregor, Anthony J. "Block-Based Distributed File Systems," Book, pp. 1-194, Jul. 1997.

PCT Notification of Transmittal of the International Search Report or the Declaration, International Application No. PCT/US01/48741, Mail Date Apr. 11, 2002, 7 pages.

Performance Without Compromise: The Virtual Storage Architecture 1997, 11 pages.

Maintenance Procedures ND (8C) nd-network disk control Feb. 1985, 1 page.

Misc. Reference Manual Pages ND (4P) nd-network disk driver Jul. 26, 1985, 3 pages.

Unix Workstation System Administration Education Certification Course, Jan. 8, 2002, 22 pages.

Vahalia, Uresh. "UNIX Internals: The New Frontiers", published by Prentice Hall, copyright 1996, 5 pages (cover-viii).

* cited by examiner

MULTI-PROTOCOL STORAGE APPLIANCE THAT PROVIDES INTEGRATED SUPPORT FOR FILE AND BLOCK ACCESS PROTOCOLS

FIELD OF THE INVENTION

The present invention relates to storage systems and, in particular, to a multi-protocol storage appliance that supports file and block access protocols.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Previous approaches generally address the SAN and NAS environments using two separate solutions. For those approaches that provide a single solution for both environments, the NAS capabilities are typically "disposed" over the SAN storage system platform using, e.g., a "sidecar" device attached to the SAN platform. However, even these prior systems typically divide storage into distinct SAN and NAS storage domains. That is, the storage spaces for the SAN and NAS domains do not coexist and are physically partitioned by a configuration process implemented by, e.g., a user (system administrator).

An example of such a prior system is the Symmetrix® system platform available from EMC® Corporation. Broadly stated, individual disks of the SAN storage system (Symmetrix system) are allocated to a NAS sidecar device (e.g., Celerra™ device) that, in turn, exports those disks to NAS clients via, e.g., the NFS and CIFS protocols. A system administrator makes decisions as to the number of disks and the locations of "slices" (extents) of those disks that are aggregated to construct "user-defined volumes" and, thereafter, how those volumes are used. The term "volume" as conventionally used in a SAN environment implies a storage entity that is constructed by specifying physical disks and extents within those disks via operations that combine those extents/disks into a user-defined volume storage entity. Notably, the SAN-based disks and NAS-based disks comprising the user-defined volumes are physically partitioned within the system platform.

Typically, the system administrator renders its decisions through a complex user interface oriented towards users that are knowledgeable about the underlying physical aspects of the system. That is, the user interface revolves primarily around physical disk structures and management that a system administrator must manipulate in order to present a view of the SAN platform on behalf of a client. For example, the user interface may prompt the administrator to specify the physical disks, along with the sizes of extents within those disks, needed to construct the user-defined volume. In addition, the interface prompts the administrator for the physical locations of those extents and disks, as well as the manner in which they are "glued together" (organized) and made visible (exported) to a SAN client as a user-defined volume corresponding to a disk or lun. Once the physical disks and their extents are selected to construct a volume, only those disks/extents comprise that volume. The system administrator must also specify the form of reliability, e.g., a Redundant Array of Independent (or Inexpensive) Disks (RAID) protection level and/or mirroring, for that constructed volume. RAID groups are then overlaid on top of those selected disks/extents.

In sum, the prior system approach requires a system administrator to finely configure the physical layout of the disks and their organization to create a user-defined volume that is exported as a single lun to a SAN client. All of the administration associated with this prior approach is grounded on a physical disk basis. For the system administrator to increase the size of the user-defined volume, disks are added and RAID calculations are re-computed to include redundant information associated with data stored on the disks constituting the volume. Clearly, this is a complex and costly approach. The present invention is directed to providing a simple and efficient integrated solution to SAN and NAS storage environments.

SUMMARY OF THE INVENTION

The present invention relates to a multi-protocol storage appliance that serves file and block protocol access to information stored on storage devices in an integrated manner for both network attached storage (NAS) and storage area network (SAN) deployments. A storage operating system of the appliance implements a file system that cooperates with novel virtualization modules to provide a virtualization system that "virtualizes" the storage space provided by the devices. Notably, the file system provides volume management capabilities for use in block-based access to the information stored on the devices. The virtualization system allows the file system to logically organize the information as named file, directory and virtual disk (vdisk) storage objects to thereby provide an integrated NAS and SAN appliance approach to storage by enabling file-based access to the files and directories, while further enabling block-based access to the vdisks.

In the illustrative embodiment, the virtualization modules are embodied, e.g., as a vdisk module and a Small Computer Systems Interface (SCSI) target module. The vdisk module provides a data path from the block-based SCSI target module to blocks managed by the file system. The vdisk module also interacts with the file system to enable access by administrative interfaces, such as a streamlined user interface (UI), in response to a system administrator issuing commands to the multi-protocol storage appliance. In addition, the vdisk module manages SAN deployments by, among other things, implementing a comprehensive set of vdisk commands issued through the UI by a system administrator. These vdisk commands are converted to primitive file system operations that interact with the file system and the SCSI target module to implement the vdisks.

The SCSI target module, in turn, initiates emulation of a disk or logical unit number (lun) by providing a mapping procedure that translates logical block access to luns specified in access requests into virtual block access to vdisks and, for responses to the requests, vdisks into luns. The SCSI target module thus provides a translation layer of the virtualization system between a SAN block (lun) space and a file system space, where luns are represented as vdisks. By "disposing" SAN virtualization over the file system, the multi-protocol storage appliance reverses the approaches taken by prior systems to thereby provide a single unified storage platform for essentially all storage access protocols.

Advantageously, the integrated multi-protocol storage appliance provides access controls and, if appropriate, sharing of files and vdisks for all protocols, while preserving data integrity. The storage appliance further provides embedded/integrated virtualization capabilities that obviate the need for a user to apportion storage resources when creating NAS and SAN storage objects. These capabilities include a virtualized storage space that allows the SAN and NAS objects to coexist with respect to global space management within the appliance. Moreover, the integrated storage appliance provides simultaneous support for block access protocols to the same vdisk, as well as a heterogeneous SAN environment with support for clustering.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention is directed to a multi-protocol storage appliance that serves both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation.

Figure 1:
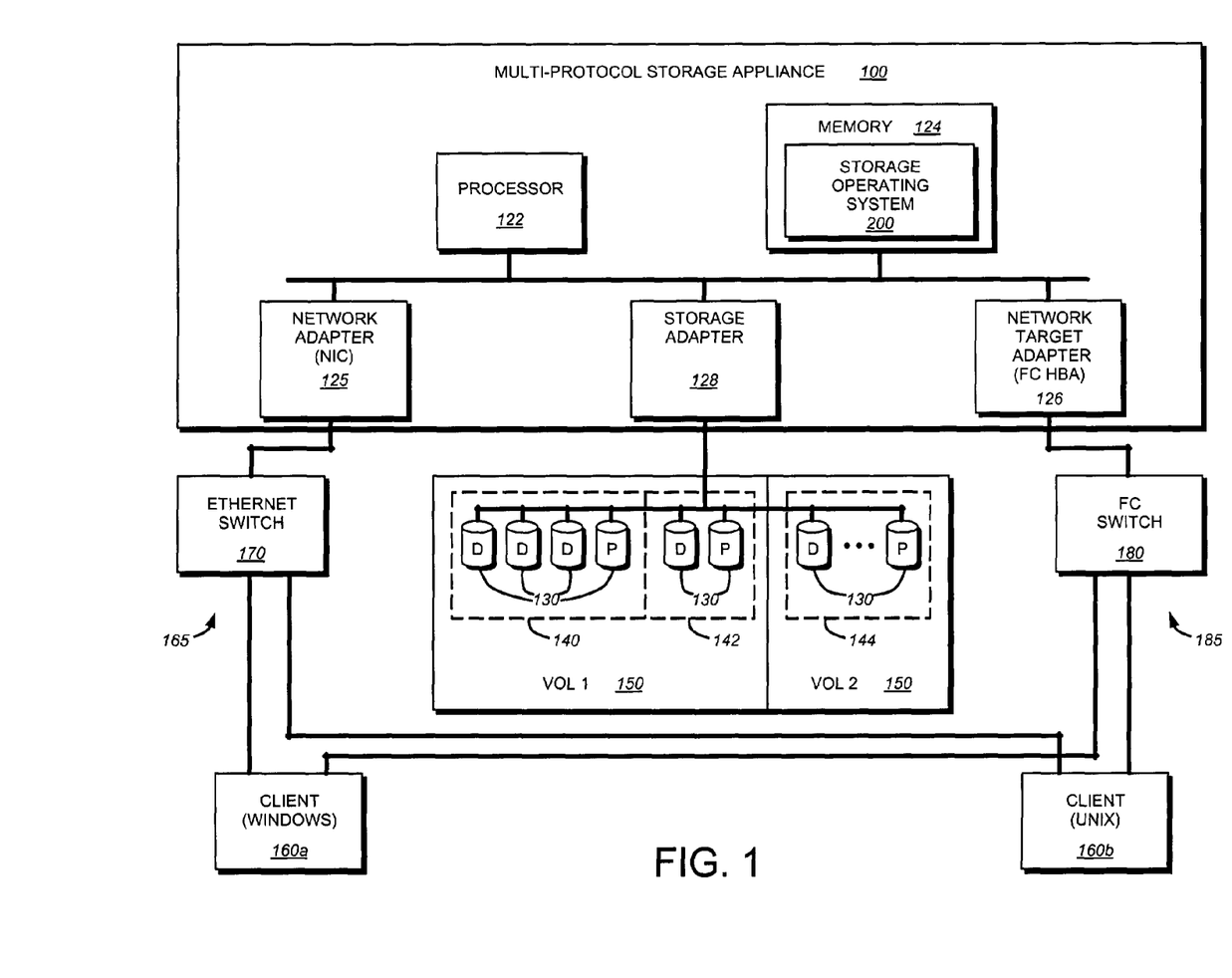
FIG. 1 is a schematic block diagram of a multi-protocol storage appliance configured to operate in storage area network (SAN) and network attached storage (NAS) environments in accordance with the present invention.

FIG. 1 is a schematic block diagram of the multi-protocol storage appliance 100 configured to provide storage service relating to the organization of information on storage devices, such as disks 130. The storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of luns or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

To facilitate access to the disks 130, the storage operating system 200 implements a write-anywhere file system of a novel virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes that may be advantageously used with the present invention is described in co-pending and commonly assigned U.S. patent application Ser. No. 10/216,453 titled Storage Virtualization by Layering Vdisks on a File System, which application is hereby incorporated by reference as though fully set forth herein.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
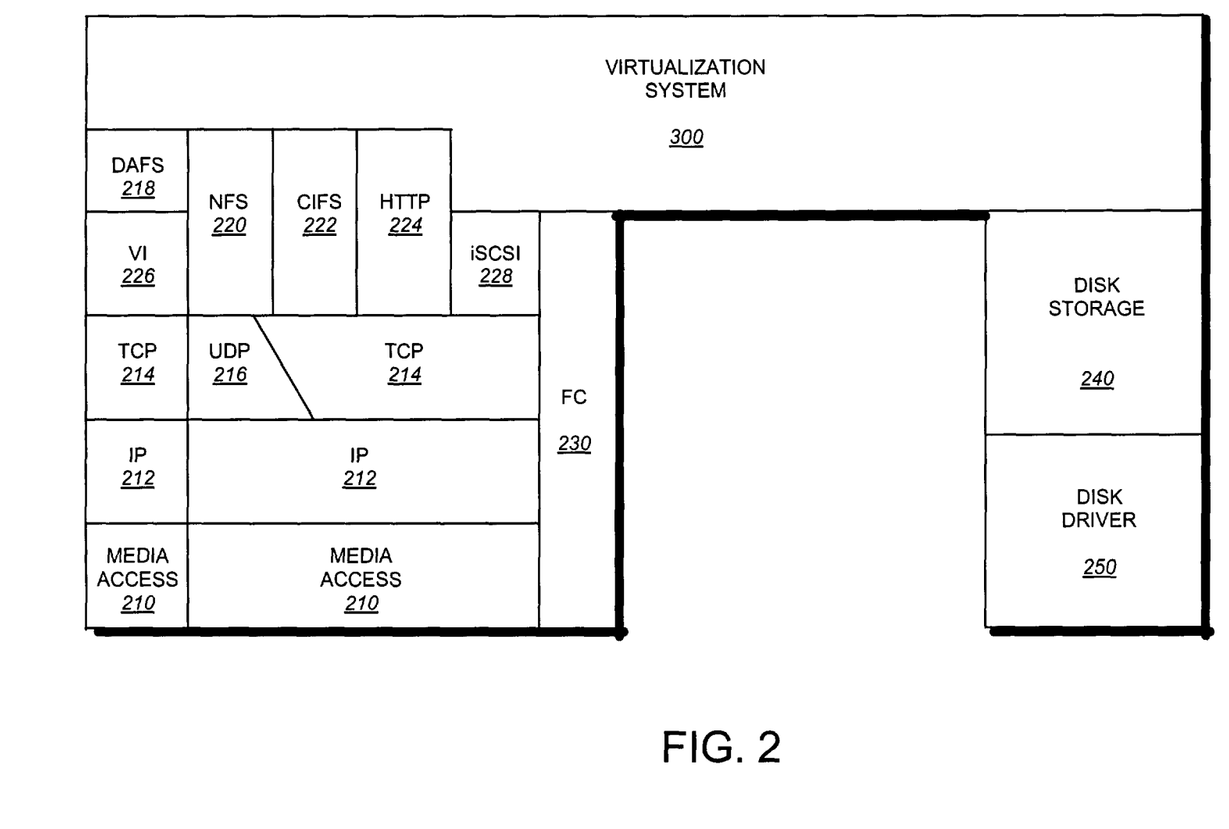
FIG. 2 is a schematic block diagram of a storage operating system of the multi-protocol storage appliance that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
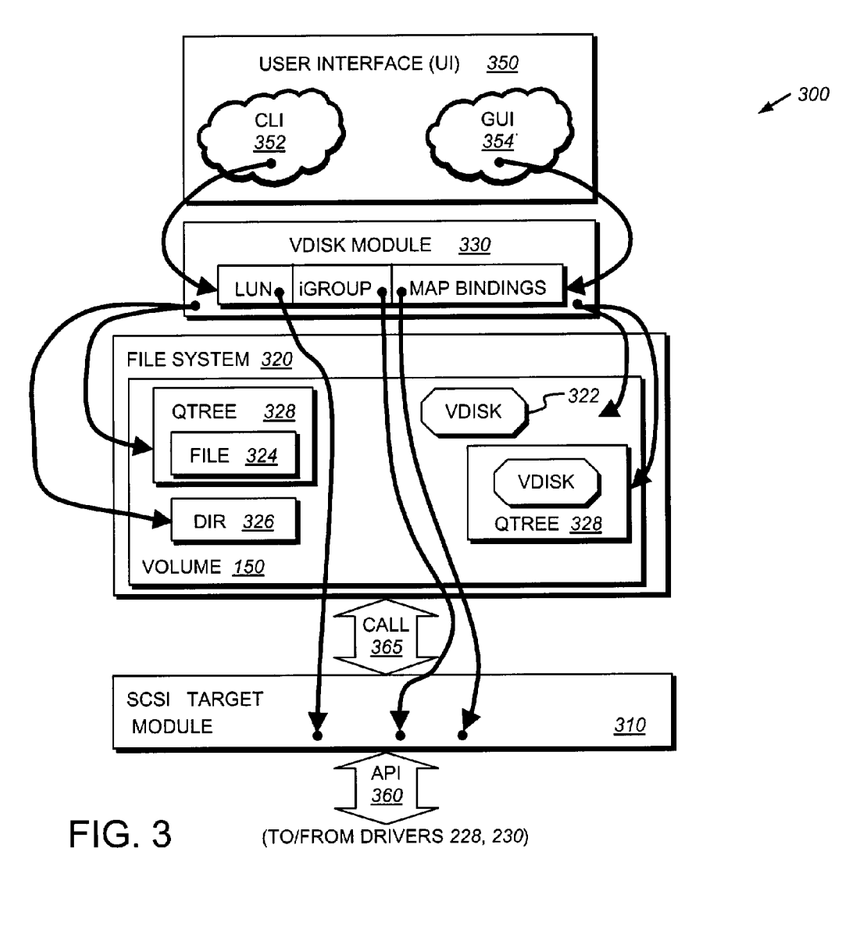
FIG. 3 is a schematic block diagram of a virtualization system that is implemented by a file system interacting with virtualization modules according to the present invention.

Bridging the disk software layers with the integrated network protocol stack layers is a virtualization system 300 according to the present invention. FIG. 3 is a schematic block diagram of the virtualization system 300 that is implemented by a file system 320 cooperating with virtualization modules illustratively embodied as, e.g., vdisk module 330 and SCSI target module 310. It should be noted that the vdisk module 330, file system 320 and SCSI target module 310 can be implemented in software, hardware, firmware, or a combination thereof. The vdisk module 330 is layered on (and interacts with) the file system 320 to provide a data path from the block-based SCSI target module to blocks managed by the file system. The vdisk module also enables access by administrative interfaces, such as a streamlined user interface (UI 350), in response to a system administrator issuing commands to the multi-protocol storage appliance 100. In essence, the vdisk module 330 manages SAN deployments by, among other things, implementing a comprehensive set of vdisk (lun) commands issued through the UI 350 by a system administrator. These vdisk commands are converted to primitive file system operations ("primitives") that interact with the file system 320 and the SCSI target module 310 to implement the vdisks.

The SCSI target module 310, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks. By "disposing" SAN virtualization over the file system 320, the multi-protocol storage appliance reverses the approaches taken by prior systems to thereby provide a single unified storage platform for essentially all storage access protocols.

According to the invention, file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 320 provides functions normally associated with a volume manager. As described herein, these functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 320 illustratively implements the WAFL file system having an on-disk format representation that is block-based using, e.g., 4 kilobyte (kB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk. A description of the structure of the file system, including the inode file, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

According to an aspect of the invention, the file system implements access operations to vdisks 322, as well as to files 324 and directories (dir 326) that coexist with respect to global space management of units of storage, such as volumes 150 and/or qtrees 328. A qtree 328 is a special directory that has the properties of a logical sub-volume within the namespace of a physical volume. Each file system storage object (file, directory or vdisk) is illustratively associated with one qtree, and quotas, security properties and other items can be assigned on a per-qtree basis. The vdisks and files/directories may be layered on top of qtrees 328 that, in turn, are layered on top of volumes 150 as abstracted by the file system "virtualization" layer 320.

Note that the vdisk storage objects in the file system 320 are associated with SAN deployments of the multi-protocol storage appliance, whereas the file and directory storage objects are associated with NAS deployments of the appliance. The files and directories are generally not accessible via the FC or SCSI block access protocols; however, a file can be converted to a vdisk and then accessed by either the SAN or NAS protocol. The vdisks are accessible as luns from the SAN (FC and SCSI) protocols and as files by the NAS (NFS and CIFS) protocols.

In another aspect of the invention, the virtualization system 300 provides a virtualized storage space that allows SAN and NAS storage objects to coexist with respect to global space management by the file system 320. To that end, the virtualization system 300 exploits the characteristics of the file system, including its inherent ability to aggregate disks and abstract them into a single pool of storage. For example, the system 300 leverages the volume management capability of the file system 320 to organize a collection of disks 130 into one or more volumes 150 representing a pool of global storage space. The pool of global storage is then made available for both SAN and NAS deployments through the creation of vdisks 322 and files 324, respectively. In addition to sharing the same global storage space, the vdisks and files share the same pool of available storage from which to draw on when expanding the SAN and/or NAS deployments. Unlike prior systems, there is no physical partitioning of disks within the global storage space of the multi-protocol storage appliance.

The multi-protocol storage appliance substantially simplifies management of the global storage space by allowing a user to manage both NAS and SAN storage objects using the single pool of storage resources. In particular, free block space is managed from a global free pool on a fine-grained block basis for both SAN and NAS deployments. If those storage objects were managed discretely (separately), the user would be required to keep a certain amount of "spare" disks on hand for each type of object to respond to changes in, e.g., business objectives. The overhead required to maintain that discrete approach is greater than if those objects could be managed out of a single pool of resources with only a single group of spared disks available for expansion as business dictates. Blocks released individually by vdisk operations are immediately reusable by NAS objects (and vice versa.) The details of such management are transparent to the administrator. This represents a "total cost of ownership" advantage of the integrated multi-protocol storage appliance.

The virtualization system 300 further provides reliability guarantees for those SAN and NAS storage objects coexisting in the global storage space of the multi-protocol appliance 100. In particular, reliability guarantees in face of disk failures through techniques such as RAID or mirroring performed at a physical block level in conventional SAN systems is an inherited feature from the file system 320 of the appliance 100. This simplifies administration by allowing an administrator to make global decisions on the underlying redundant physical storage that apply equally to vdisks and NAS objects in the file system.

As noted, the file system 320 organizes information as file, directory and vdisk objects within volumes 150 of disks 130. Underlying each volume 150 is a collection of RAID groups 140-144 that provide protection and reliability against disk failure(s) within the volume. The information serviced by the multi-protocol storage appliance is protected according to an illustrative RAID 4 configuration. This level of protection may be extended to include, e.g., synchronous mirroring on the appliance platform. A vdisk 322 created on a volume that is protected by RAID 4 "inherits" the added protection of synchronous mirroring if that latter protection is specified for the volume 150. In this case, the synchronous mirroring protection is not a property of the vdisk but rather a property of the underlying volume and the reliability guarantees of the file system 320. This "inheritance" feature of the multi-protocol storage appliance simplifies management of a vdisk because a system administrator does not have to deal with reliability issues.

In addition, the virtualization system 300 aggregates bandwidth of the disks 130 without requiring user knowledge of the physical construction of those disks. The file system 320 is configured to write (store) data on the disks as long, continuous stripes across those disks in accordance with input/output (I/O) storage operations that aggregate the bandwidth of all the disks of a volume for stored data. When information is stored or retrieved from the vdisks, the I/O operations are not directed to disks specified by a user. Rather, those operations are transparent to the user because the file system "stripes" that data across all the disks of the volume in a reliable manner according to its write anywhere layout policy. As a result of virtualization of block storage, I/O bandwidth to a vdisk can be the maximum bandwidth of the underlying physical disks of the file system, regardless of the size of the vdisk (unlike typical physical implementations of luns in conventional block access products.)

Moreover, the virtualization system leverages file system placement, management and block allocation policies to make the vdisks function correctly within the multi-protocol storage appliance. The vdisk block placement policies are a function of the underlying virtualizing file system and there are no permanent physical bindings of file system blocks to SCSI logical block addresses in the face of modifications. The vdisks may be transparently reorganized to perhaps alter data access pattern behaviour.

For both SAN and NAS deployments, the block allocation policies are independent of physical properties of the disks (e.g., geometries, sizes, cylinders, sector size). The file system provides file-based management of the files 324 and directories 326 and, in accordance with the invention, vdisks 322 residing within the volumes 150. When a disk is added to the array attached to the multi-protocol storage appliance, that disk is integrated into an existing volume to increase the entire volume space, which space may be used for any purpose, e.g., more vdisks or more files.

Management of the integrated multi-protocol storage appliance 100 is simplified through the use of the UI 350 and the vdisk command set available to the system administrator. The UI 350 illustratively comprises both a command line interface (CLI 352) and a graphical user interface (GUI 354) used to implement the vdisk command set to, among other things, create a vdisk, increase/decrease the size of a vdisk and/or destroy a vdisk. The storage space for the destroyed vdisk may then be reused for, e.g., a NAS-based file in accordance with the virtualized storage space feature of the appliance 100. A vdisk may increase ("grow") or decrease ("shrink") under user control while preserving block and NAS multi-protocol access to its application data.

The UI 350 simplifies management of the multi-protocol SAN/NAS storage appliance by, e.g., obviating the need for a system administrator to explicitly configure and specify the disks to be used when creating a vdisk. For instance to create a vdisk, the system administrator need merely issue a vdisk ("lun create") command through, e.g., the CLI 352 or GUI 354. The vdisk command specifies creation of a vdisk (lun), along with the desired size of the vdisk and a path descriptor (pathname) to that vdisk. In response, the file system 320 cooperates with the vdisk module 330 to "virtualize" the storage space provided by the underlying disks and create a vdisk as specified by the create command. Specifically, the vdisk module 330 processes the vdisk command to "call" primitive operations ("primitives") in the file system 320 that implement high-level notions of vdisks (luns). For example, the "lun create" command is translated into a series of file system primitives that create a vdisk with correct information and size, as well as at the correct location. These file system primitives include operations to create a file inode (create_file), create a stream inode (create_stream), and store information in the stream inode (stream_write).

The result of the lun create command is the creation of a vdisk 322 having the specified size and that is RAID protected without having to explicitly specify such protection. Storage of information on disks of the multi-protocol storage appliance is not typed; only "raw" bits are stored on the disks. The file system organizes those bits into vdisks and RAID groups across all of the disks within a volume. Thus, the created vdisk 322 does not have to be explicitly configured because the virtualization system 300 creates a vdisk in a manner that is transparent to the user. The created vdisk inherits high-performance characteristics, such as reliability and storage bandwidth, of the underlying volume created by the file system.

The CLI 352 and/or GUI 354 also interact with the vdisk module 330 to introduce attributes and persistent lun map bindings that assign numbers to the created vdisk. These lun map bindings are thereafter used to export vdisks as certain SCSI identifiers (IDs) to the clients. In particular, the created vdisk can be exported via a lun mapping technique to enable a SAN client to "view" (access) a disk. Vdisks (luns) generally require strict controlled access in a SAN environment; sharing of luns in a SAN environment typically occurs only in limited circumstances, such as clustered file systems, clustered operating systems and multi-pathing configurations. A system administrator of the multi-protocol storage appliance determines which vdisks (luns) can be exported to a SAN client. Once a vdisk is exported as a lun, the client may access the vdisk over the SAN network utilizing a block access protocol, such as FCP and iSCSI.

SAN clients typically identify and address disks by logical numbers or luns. However, an "ease of management" feature of the multi-protocol storage appliance is that system administrators can manage vdisks and their addressing by logical names. To that end, the vdisk module 330 of the multi-protocol storage appliance maps logical names to vdisks. For example when creating a vdisk, the system administrator "right size" allocates the vdisk and assigns it a name that is generally meaningful to its intended application (e.g., /vol/vol0/database to hold a database). The administrative interface provides name-based management of luns/vdisks (as well as files) exported from the storage appliance on the clients, thereby providing a uniform and unified naming scheme for block-based (as well as file-based) storage.

The multi-protocol storage appliance manages export control of vdisks by logical names through the use of initiator groups (igroups). An igroup is a logical named entity that is assigned to one or more addresses associated with one or more initiators (depending upon whether a clustered environment is configured). An "igroup create" command essentially "binds" (associates) those addresses, which may comprise WWN addresses or iSCSI IDs, to a logical name or igroup. A "lun map" command is then used to export one or more vdisks to the igroup, i.e., make the vdisk(s) "visible" to the igroup. In this sense, the "lun map" command is equivalent to an NFS export or a CIFS share. The WWN addresses or iSCSI IDs thus identify the clients that are allowed to access those vdisks specified by the lun map command. Thereafter, the logical name is used with all operations internal to the storage operating system. This logical naming abstraction is pervasive throughout the entire vdisk command set, including interactions between a user and the multi-protocol storage appliance. In particular, the igroup naming convention is used for all subsequent export operations and listings of luns that are exported for various SAN clients.

Figure 4:
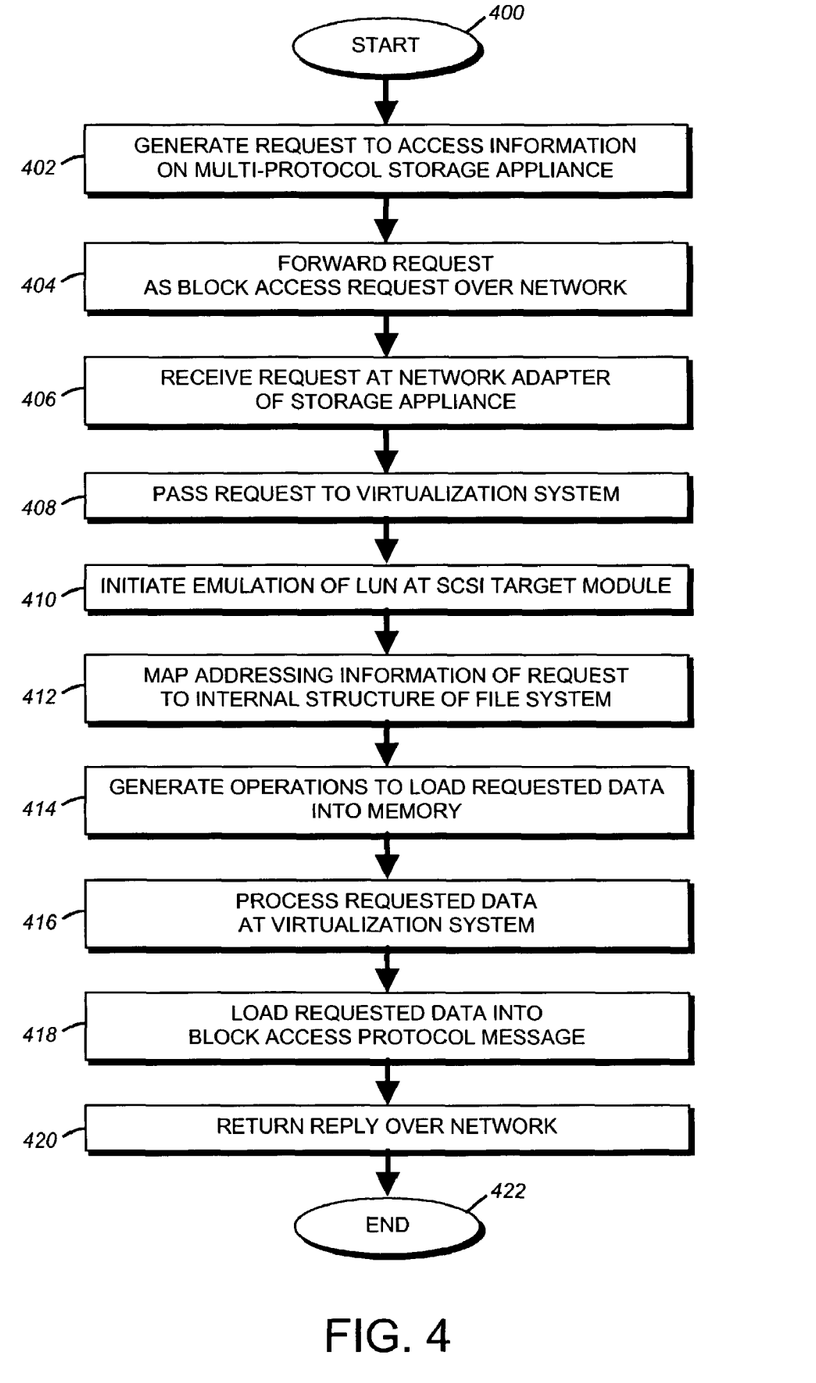
FIG. 4 is a flowchart illustrating the sequence of steps involved when accessing information stored on the multi-protocol storage appliance over a SAN network.

FIG. 4 is a schematic flow chart illustrating the sequence of steps involved when accessing information stored on the multi-protocol storage appliance over a SAN network. Here, a client communicates with the storage appliance 100 using a block access protocol over a network coupled to the appliance. If the client is client 160a running the Windows operating system, the block access protocol is illustratively the FCP protocol used over the network 185. On the other hand, if the client is client 160b running the UNIX operating system, the block access protocol is illustratively the iSCSI protocol used over network 165. The sequence starts at Step 400 and proceeds to Step 402 where the client generates a request to access information residing on the multi-protocol storage appliance and, in Step 404, the request is forwarded as a conventional FCP or iSCSI block access request over the network 185, 165.

At Step 406, the request is received at network adapter 126, 125 of the storage appliance 100, where it is processed by the integrated network protocol stack and passed to the virtualization system 300 at Step 408. Specifically, if the request is a FCP request, it is processed as, e.g., a 4k block request to access (i.e., read/write) data by the FC driver 230. If the request is an iSCSI protocol request, it is received at the media access layer (the Intel gigabit Ethernet) and passed through the TCP/IP network protocol layers to the virtualization system.

Command and control operations, including addressing information, associated with the SCSI protocol are generally directed to disks or luns; however, the file system 320 does not recognize luns. As a result, the SCSI target module 310 of the virtualization system initiates emulation of a lun in order to respond to the SCSI commands contained in the request (Step 410). To that end, the SCSI target module has a set of application programming interfaces (APIs 360) that are based on the SCSI protocol and that enable a consistent interface to both the iSCSI and FCP drivers 228, 230. The SCSI target module further implements a mapping/translation procedure that essentially translates a lun into a vdisk. At Step 412, the SCSI target module maps the addressing information, e.g., FC routing information, of the request to the internal structure of the file system.

The file system 320 is illustratively a message-based system; as such, the SCSI target module 310 transposes the SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 310 passes the message into the file system layer 320 as, e.g., a function call 365, where the operation is performed.

In response to receiving the message, the file system 320 maps the pathname to inode structures to obtain the file handle corresponding to the vdisk 322. Armed with a file handle, the storage operating system 200 can convert that handle to a disk block and, thus, retrieve the block (inode) from disk. Broadly stated, the file handle is an internal representation of the data structure, i.e., a representation of the inode data structure that is used internally within the file system. The file handle generally consists of a plurality of components including a file ID (inode number), a snapshot ID, a generation ID and a flag. The file system utilizes the file handle to retrieve the special file inode and at least one associated stream inode that comprise the vdisk within the file system structure implemented on the disks 130.

In Step 414, the file system generates operations to load (retrieve) the requested data from disk 130 if it is not resident "in core", i.e., in the memory 124. If the information is not in memory, the file system 320 indexes into the inode file using the inode number to access an appropriate entry and retrieve a logical volume block number (VBN). The file system then passes the logical VBN to the disk storage (RAID) layer 240, which maps that logical number to a disk block number and sends the latter to an appropriate driver (e.g., SCSI) of the disk driver layer 250. The disk driver accesses the disk block number from disk 130 and loads the requested data block(s) in memory 124. In Step 416, the requested data is processed by the virtualization system 300. For example, the data may be processed in connection with a read or write operation directed to a vdisk or in connection with a query command for the vdisk.

The SCSI target module 310 of the virtualization system 300 emulates support for the conventional SCSI protocol by providing meaningful "simulated" information about a requested vdisk. Such information is either calculated by the SCSI target module or stored persistently in, e.g., the attributes stream inode of the vdisk. At Step 418, the SCSI target module 310 loads the requested block-based information (as translated from file-based information provided by the file system 320) into a block access (SCSI) protocol message. For example, the SCSI target module 310 may load information, such as the size of a vdisk, into a SCSI protocol message in response to a SCSI query command request. Upon completion of the request, the storage appliance (and operating system) returns a reply (e.g., as a SCSI "capacity" response message) to the client over the network (Step 420). The sequence then ends at Step 422.

It should be noted that the software "path" through the storage operating system layers described above needed to perform data storage access for the client request received at the multi-protocol storage appliance may alternatively be implemented in hardware. That is, in an alternate embodiment of the invention, a storage access request data path through the operating system layers (including the virtualization system 300) may be implemented as logic circuitry embodied within a field programmable gate array (FPGA) or an application specific integrated circuit (ASIC). This type of hardware implementation increases the performance of the storage service provided by appliance 100 in response to a file access or block access request issued by a client 160. Moreover, in another alternate embodiment of the invention, the processing elements of network and storage adapters 125-128 may be configured to offload some or all of the packet processing and storage access operations, respectively, from processor 122 to thereby increase the performance of the storage service provided by the multi-protocol storage appliance. It is expressly contemplated that the various processes, architectures and procedures described herein can be implemented in hardware, firmware or software.

Advantageously, the integrated multi-protocol storage appliance provides access controls and, if appropriate, sharing of files and vdisks for all protocols, while preserving data integrity. The storage appliance further provides embedded/integrated virtualization capabilities that obviate the need for a user to apportion storage resources when creating NAS and SAN storage objects. These capabilities include a virtualized storage space that allows SAN and NAS storage objects to coexist with respect to global space management within the appliance. Moreover, the integrated storage appliance provides simultaneous support for block access protocols (iSCSI and FCP) to the same vdisk, as well as a heterogeneous SAN environment with support for clustering. In sum, the multi-protocol storage appliance provides a single unified storage platform for all storage access protocols.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A storage operating system executed by a processor of a storage system configured to provide storage service relating to information stored on storage devices coupled to the storage system, comprising:
    a network protocol stack of the storage system that provides data paths to access the information using block and file access protocols;
    a file system of the storage operating system configured to cooperate with virtualization modules to virtualize a storage space provided by the storage devices, wherein the virtualization modules comprise a virtual disk module and a Small Computer System Interface (SCSI) target module, and wherein the block and file access protocols access files, directories, and virtual disks on the storage devices are both processed by the file system of the storage operating system;
    the SCSI target module configured to provide a mapping procedure that translates storage area network (SAN) requests received at the network protocol stack into access requests for a virtual disk stored within the virtual storage space, wherein the virtual disk is a file type that emulates a disk;
    the virtual disk module to provide a data path from the SCSI target module to blocks managed by the file system;
    a uniform naming scheme for file-based and block-based storage configured to provide name-based management of the files and virtual disks stored on the storage system; and
    the file system further configured to provide a hierarchical structure of the files and virtual disks on the storage devices.

2. The storage operating system of claim 1 wherein the block access protocols comprise SCSI based protocols, SCSI encapsulated over a Transport Control Protocol (iSCSI) and SCSI encapsulated over Fibre Channel (FCP).

3. The storage operating system of claim 2 wherein the network protocol stack comprises:
    network protocol layers;
    a file system protocol layer that interfaces to the network protocol layers and provides file-based protocol access to the files and directories organized by the file system; and
    an iSCSI driver disposed over the network protocol layers to provide block-based protocol access to the virtual disks organized by the file system.

4. The storage operating system of claim 3 wherein the network protocol stack further comprises a virtual interface layer that provides direct access transport capabilities for the file access protocol of the file system protocol layer.

5. The storage operating system of claim 3 wherein the network protocol stack further comprises a Fibre Channel (FC) driver configured to receive and transmit block access requests to access the virtual disks organized by the file system.

6. The storage operating system of claim 5 wherein the FC and iSCSI drivers provide FC-specific and iSCSI-specific access control to the virtual disks and further manage exports of the virtual disks to iSCSI and FCP when accessing the virtual disks on the storage system.

7. The method of claim 1 wherein the block and file access protocols are both processed by the file system of the storage operating system further comprises translating the block and file access protocols into file system primitives.

8. A method for serving file and block protocol access to information stored on storage devices of a multi-protocol storage appliance for both network attached storage (NAS) and storage area network (SAN) deployments, comprising:
    providing NAS services using a network adapter connecting the multi-protocol storage appliance to a first network and file system capabilities of a file system that allow the multi-protocol storage appliance to respond to file-based requests issued by a NAS client to access the stored information as a file;
    providing SAN services using a network target adapter connecting the multi-protocol storage appliance to a second network and volume management capabilities of the file system that allow the multi-protocol storage appliance to respond to block-based requests issued by a SAN client to access the stored information as a virtual disk, wherein requests from the NAS client and the SAN client are directed to a shared global storage space and the virtual disk is a file type that emulates a disk, and the NAS services and the SAN services are processed by the file system;
    providing name-based management of the files and virtual disks stored on the multi-protocol storage appliance to provide a uniform naming scheme for file-based and block-based storage; and
    providing a hierarchical structure of the files and virtual disks stored on the storage devices.

9. The method of claim 8, further comprising:
    translating the block-based requests into access requests for the shared global storage space using a small computer systems interface (SCSI) target module; and
    providing a data path from the SCSI target module to blocks managed by the file system using a vdisk module.

10. The method of claim 9 wherein the SCSI target module initiates emulation of the disk or logical unit number (lun) by providing a mapping procedure that translates the lun into the virtual disk.

11. The method of claim 8 wherein the SAN and the NAS services are both processed by the file system of a storage operating system and further comprises translating block and file access protocols into file system primitives.

12. A storage system configured to provide file protocol and block protocol access to information stored on storage devices for both network attached storage (NAS) and storage area network (SAN) deployments, comprising:

a storage operating system executed by a processor, the storage operating system configured to implement a file system cooperating with a virtualization module to virtualize a storage space provided by the storage devices, the storage space configured to store information from both file protocol and block protocol access requests received from one or more clients, wherein the NAS deployments and the SAN deployments are processed by the file system;

a uniform naming scheme for file-based and block-based storage configured to provide name-based management of files and virtual disks stored on the storage system; and the file system configured to provide a hierarchical structure of the files and virtual disks on the storage devices.

13. The storage system of claim 12 wherein the virtualization module comprises a vdisk module and a Small Computer Systems Interface (SCSI) target module.

14. The storage system of claim 13 wherein the vdisk module is layered on the file system to enable access by administrative interfaces in response to a system administrator issuing commands to the storage system.

15. The storage system of claim 14 wherein the administrative interfaces comprise a user interface (UI).

16. The storage system of claim 15 wherein the vdisk module manages the SAN deployments by implementing a set of vdisk commands issued through the UI.

17. The storage system of claim 16 wherein vdisk commands are converted to primitive file system operations that interact with the file system and the SCSI target module to implement the virtual disks.

18. The storage system of claim 13 wherein the SCSI target module initiates emulation of a disk or logical unit number (lun) by providing a mapping procedure that translates the lun into the virtual disk.

19. The storage system of claim 13 wherein the SCSI target module provides a translation layer between a SAN block space and a file system space.

20. The storage system of claim 12 wherein the virtualized storage space allows SAN and NAS storage objects to coexist with respect to global space management by the file system.

21. The storage system of claim 20 wherein the file system cooperates with the virtualization module to provide a virtualization system that provides reliability guarantees for the SAN and NAS storage objects coexisting in the virtualized storage space.

22. The storage system of claim 12 wherein the file system provides volume management capabilities for use in block-based access to the information stored on the storage devices.

23. The storage system of claim 12 wherein the storage devices are disks.

24. The storage system of claim 12 wherein the file system provides file system semantics and functions associated with a volume manager.

25. The storage system of claim 24 wherein the functions associated with the volume manager comprise at least one of:
aggregation of the storage devices;
aggregation of storage bandwidth of the devices; and
reliability guarantees.

26. A storage operating system executed by a processor of a storage system configured to provide storage service relating to organization of information stored on storage devices coupled to the storage system, comprising:
a network protocol stack of the storage system configured to provide data paths to access the information stored on the storage devices using block-based and file-based access protocols;

the storage system further configured to cooperate with a virtualization module to virtualize a storage space provided by the storage devices, wherein the virtualization module provides emulation of a storage device through a virtual disk, and the file-based protocols and the block-based protocols are both processed by the storage operating system;

a uniform naming scheme for file-based and block-based storage configured to provide name-based management of files and virtual disks stored on the storage system; and the storage operating system further configured to provide a hierarchical structure of the files and virtual disks.

27. The storage operating system of claim 26 wherein the block-based access protocols comprise Small Computer Systems Interface (SCSI) based protocols, SCSI encapsulated over a Transport Control Protocol (iSCSI) and SCSI encapsulated over Fibre Channel (FCP).

28. The storage operating system of claim 26 wherein the network protocol stack comprises:
network protocol layers;
a file system protocol layer that interfaces to the network protocol layers and provides file-based protocol access to files and directories organized by a file system of the storage operating system; and
an iSCSI driver disposed over the network protocol layers to provide block-based protocol access to the virtual disks organized by the file system.

29. The storage operating system of claim 28 wherein the network protocol stack further comprises a virtual interface layer that provides direct access transport capabilities for a file access protocol of the file system protocol layer.

30. The storage operating system of claim 28 wherein the network protocol stack further comprises a Fibre Channel (FC) driver configured to receive and transmit block access requests to access the virtual disk organized by the file system.

31. The storage operating system of claim 30 wherein the FC and iSCSI drivers provide FC-specific and iSCSI-specific access control to the virtual disk and further manage exports of the virtual disk to iSCSI and FCP when accessing the virtual disk on the storage system.

32. The storage operating system of claim 26 wherein the block-based and file-based protocols are both processed by a file system of the storage operating system to translate the block-based and file-based protocols into file system primitives.

33. A storage system, comprising:
a network target adapter configured to receive a block access request from a storage area network (SAN) client;
a network adapter configured to receive a file access request from a network attached storage (NAS) client;
a storage operating system of the storage system executed by a processor, the storage operating system configured to implement a file system, the file system configured to process NAS and SAN access requests;
a SCSI target module configured to translate the block access request into an access request for a virtual disk managed by the file system;
a vdisk module configured to provide a data path from the SCSI target module to the virtual disk managed by the file system;
a uniform naming scheme for file-based and block-based storage configured to provide name-based management of files and virtual disks; and the file system further configured to provide a hierarchical structure of the files and virtual disks stored on storage devices.

34. A processor-implemented method, comprising:
receiving a block access request from a storage area network (SAN) client, and receiving a file access request from a network attached storage (NAS) client;
implementing a file system on a storage system, wherein the file system organizes information as files, directories, and virtual disks and the file system configured to process both the file access request and the block access request;
translating the block access request into an access request for a virtual disk managed by the file system, wherein the virtual disk is a file type that emulates a disk;
providing a data path from a SCSI target module to the virtual disk managed by the file system;
providing name-based management of the files and virtual disks to provide a uniform naming scheme for file-based and block-based storage; and
providing a hierarchical structure of the files and virtual disks stored on storage devices.

35. The method of claim 34 wherein the block and file access protocols are both processed by the file system of a storage operating system and further comprises translating block and file access protocols into file system primitives.

36. A storage system, comprising:
a server configured with an operating system configured to be executed by a processor, the operating system configured to implement a file system, the file system configured to organize information as files, directories, and virtual disks;
a network target adapter configured to execute on the server, the network target adapter further configured to receive a block access request from a client, and a network adapter configured to receive a file access request from the client, the file system further configured to process both the file access request and the block access request;
a small computer systems interface (SCSI) target module configured to execute on the server, the SCSI target module further configured to translate the block access request into an access request for a virtual disk (vdisk), wherein the vdisk is a file type that emulates a disk;
a vdisk module configured to execute on the server, the vdisk module further configured to provide a data path from the SCSI target module to the vdisk managed by the file system;
a uniform naming scheme for file-based and block-based storage configured to provide name-based management of the files and vdisks; and
the file system further configured to provide a hierarchical structure of the files and vdisks on the storage devices.

37. A storage system, comprising:
a server configured with an operating system configured to be executed by a processor, the operating system configured to implement a file system, the file system configured to organize information as files, directories, and virtual disks;
a plurality of storage devices configured to connect to the server, the plurality of storage devices organized into one or more volumes representing a global storage space where the information is arranged in a file-based system;
a network target adapter configured to execute on the server, the network target adapter further configured to receive a block access request from a storage area network (SAN) client, and a network adapter configured to receive a file access request from a network attached storage (NAS) client, the file system further configured to process both the file access request and the block access request;
a SCSI target module configured to execute on the server, the SCSI target module further configured to translate the block access request into an access request for a virtual disk, the virtual disk configured as a file that emulates a disk;
a vdisk module configured to execute on the server, the vdisk module further configured to provide a data path from the SCSI target module to the virtual disk managed by the file system;
a uniform naming scheme for file-based and block-based storage configured to provide name-based management of the files and virtual disks on the storage system; and
the file system further configured to provide a hierarchical structure of the files and virtual disks on the storage devices.

* * * * *

UNITED STATES PATENT AND TRADEMARK OFFICE
CERTIFICATE OF CORRECTION

| | | |
|---|---|---|
| PATENT NO. | : 7,873,700 B2 | Page 1 of 1 |
| APPLICATION NO. | : 10/215917 | |
| DATED | : January 18, 2011 | |
| INVENTOR(S) | : Brian Pawlowski | |

It is certified that error appears in the above-identified patent and that said Letters Patent is hereby corrected as shown below:

In Col. 7, line 59, should read:

tem, which is implemented as a ~~microkemel~~ microkernel. The storage

Signed and Sealed this
Twenty-fourth Day of January, 2012

David J. Kappos
*Director of the United States Patent and Trademark Office*